United States Patent
Noguchi

(10) Patent No.: US 11,388,542 B2
(45) Date of Patent: Jul. 12, 2022

(54) VEHICLE

(71) Applicant: HONDA MOTOR CO., LTD., Tokyo (JP)

(72) Inventor: Kohei Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/192,163

(22) Filed: Mar. 4, 2021

(65) Prior Publication Data

US 2021/0306790 A1   Sep. 30, 2021

(30) Foreign Application Priority Data

Mar. 31, 2020 (JP) .............................. JP2020-061877

(51) Int. Cl.
| | |
|---|---|
| *H04S 7/00* | (2006.01) |
| *H04R 1/40* | (2006.01) |
| *B62J 45/10* | (2020.01) |
| *G06F 3/16* | (2006.01) |

(52) U.S. Cl.
CPC .............. *H04S 7/303* (2013.01); *B62J 45/10* (2020.02); *G06F 3/165* (2013.01); *H04R 1/403* (2013.01); *H04R 2430/01* (2013.01)

(58) Field of Classification Search
CPC ...... H04S 7/303; H04R 1/403; H04R 2430/01
See application file for complete search history.

(56) References Cited

U.S. PATENT DOCUMENTS

2014/0023211 A1*   1/2014   Inou ................. B60Q 9/00
                                                    381/302
2021/0303256 A1*   9/2021   Noguchi ........... B62J 45/4151

FOREIGN PATENT DOCUMENTS

| JP | 2007-116393 | 5/2007 | |
|---|---|---|---|
| JP | 2012-204926 | 10/2012 | |
| JP | 5664603 | 2/2015 | |
| JP | 2016-107978 | 6/2016 | |
| JP | 2017-178284 | 10/2017 | |
| WO | WO-2019175273 A1 * | 9/2019 | ............ B60K 35/00 |

OTHER PUBLICATIONS

Indian Office Action dated Feb. 2, 2022, English abstract included, 5 pages.
Japanese Office Action dated Oct. 26, 2021, English translation included, 7 pages.

* cited by examiner

*Primary Examiner* — David L Ton
(74) *Attorney, Agent, or Firm* — Rankin, Hill & Clark LLP

(57) ABSTRACT

A vehicle includes an in-vehicle device and a speaker array. The in-vehicle device acquires information that identifies a posture of an occupant of the vehicle by use of an occupant posture acquisition portion. The in-vehicle device controls a sound outputted from the speaker array to a sound arriving from a virtual sound source that is set at a predetermined position, and corrects the position of the virtual sound source based on the posture of the occupant by use of a sound control portion.

5 Claims, 15 Drawing Sheets

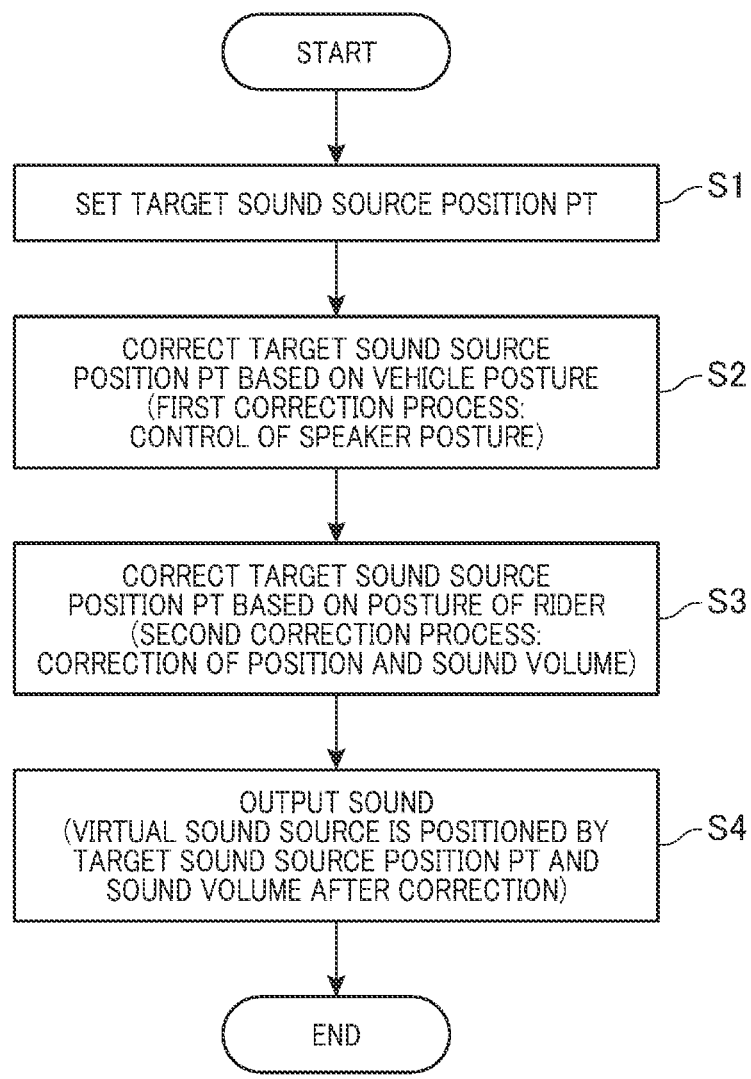

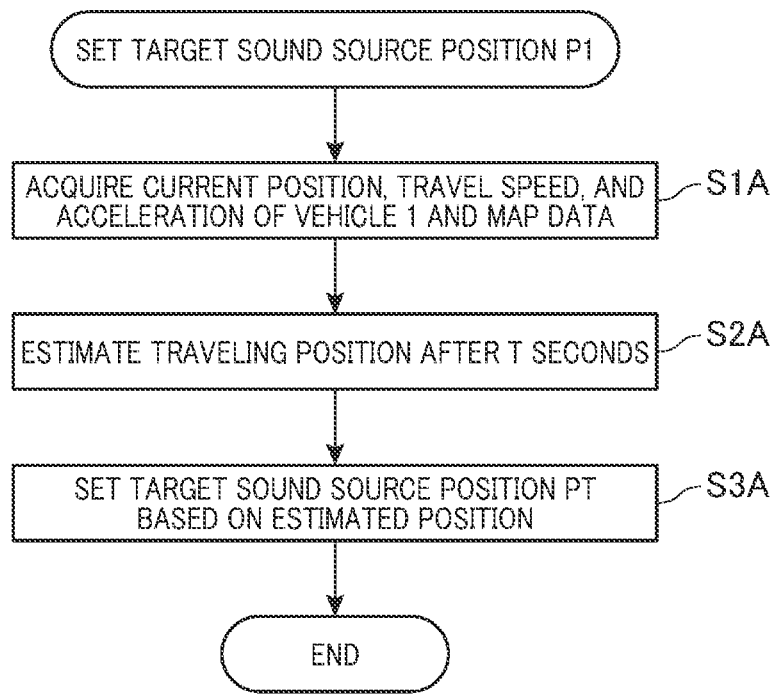

VEHICLE

INCORPORATION BY REFERENCE

The present application claims priority under 35 U.S.C. § 119 to Japanese Patent Application No. 2020-061877 filed on Mar. 31, 2020. The content of the application is incorporated herein by reference in its entirety.

BACKGROUND OF THE INVENTION

Field of the Invention

The present invention relates to a vehicle.

Description of the Related Art

A vehicle including an in-vehicle sound device is disclosed (for example, Patent Literature 1) in which a head-related transfer function indicating a transfer function of sound from a virtual sound source to a listener's eardrum is used to position a sound image formed by an R speaker and an L speaker to a fixation point. In the technology of Patent Literature 1, a fixation point is positioned on a road ahead of a host vehicle. A gaze of a driver is thus guided to an appropriate direction in driving a vehicle or to a direction to be gazed in a future. A fixation point is a position reflecting a position of a vehicle, a speed and yaw rate of the vehicle, and a driving environment of the vehicle.

CITATION LIST

Patent Literature

[Patent Literature 1] Japanese Patent No. 5664603

Technical Problem

In the technology of Patent Literature 1, when a posture of an occupant changes, a gaze angle to a fixation point (equivalent to a virtual sound source) that is set at a guidance target of a gaze changes. This may cause an occupant to feel discomfort. Particularly in a saddle riding vehicle such as a motorcycle, an occupant may drive in an upright posture or in a bending posture. As the posture of the occupant changes larger, the eye gaze angle to the fixation point changes larger. The occupant may thus feel discomfort or view the fixation point obscurely.

An object of the present invention is to easily set a virtual sound source to reduce discomfort of an occupant even when the occupant changes in posture.

SUMMARY OF THE INVENTION

To achieve the above object, a vehicle includes a plurality of speakers (31) and a sound control portion (58C) that controls a sound outputted from each speaker (31). The vehicle includes an occupant posture acquisition portion (58H) that acquires information that identifies a posture of an occupant. The sound control portion (58C) controls the sound outputted from the speakers (31) to a sound arriving from a virtual sound source that is set at a predetermined position. The sound control portion (58C) corrects the position of the virtual sound source based on a posture of the occupant.

In the above configuration, the occupant posture acquisition portion (58H) acquires information that identifies a position of a head of the occupant. The sound control portion (58C) may correct the position of the virtual sound source based on the position of the head of the occupant. In the above configuration, the sound control portion (58C) may correct the position of the virtual sound source based on the height of the head of the occupant.

In the above configuration, the sound control portion (58C) may change the position of the virtual sound source to the longitudinal direction of the vehicle based on the height of the head of the occupant. In the above configuration, the sound control portion (58C) may correct a sound volume of the speakers based on the above information.

Advantageous Effects of Invention

According to the present invention, a virtual sound source is easily set to reduce discomfort of an occupant even when a posture of the occupant changes.

BRIEF DESCRIPTION OF THE DRAWINGS

FIG. 9 is a flowchart illustrating operations about a virtual sound source by a sound control portion.

FIG. 10 is a flowchart of an example of a process of Step S1 of FIG. 9.

DETAILED DESCRIPTION OF THE PREFERRED EMBODIMENT

Hereinafter, an embodiment of the present invention is explained with reference to the drawings. The descriptions of directions such as front, rear, left, right, and up, and down are the same as those relative to a vehicle body unless indicated otherwise. A reference sign FR in each figure illustrates a front direction of a vehicle body. A reference sign UP in each figure illustrates an upper direction of a vehicle body. A reference sign LH illustrates a left direction of a vehicle body.

Figure 1:
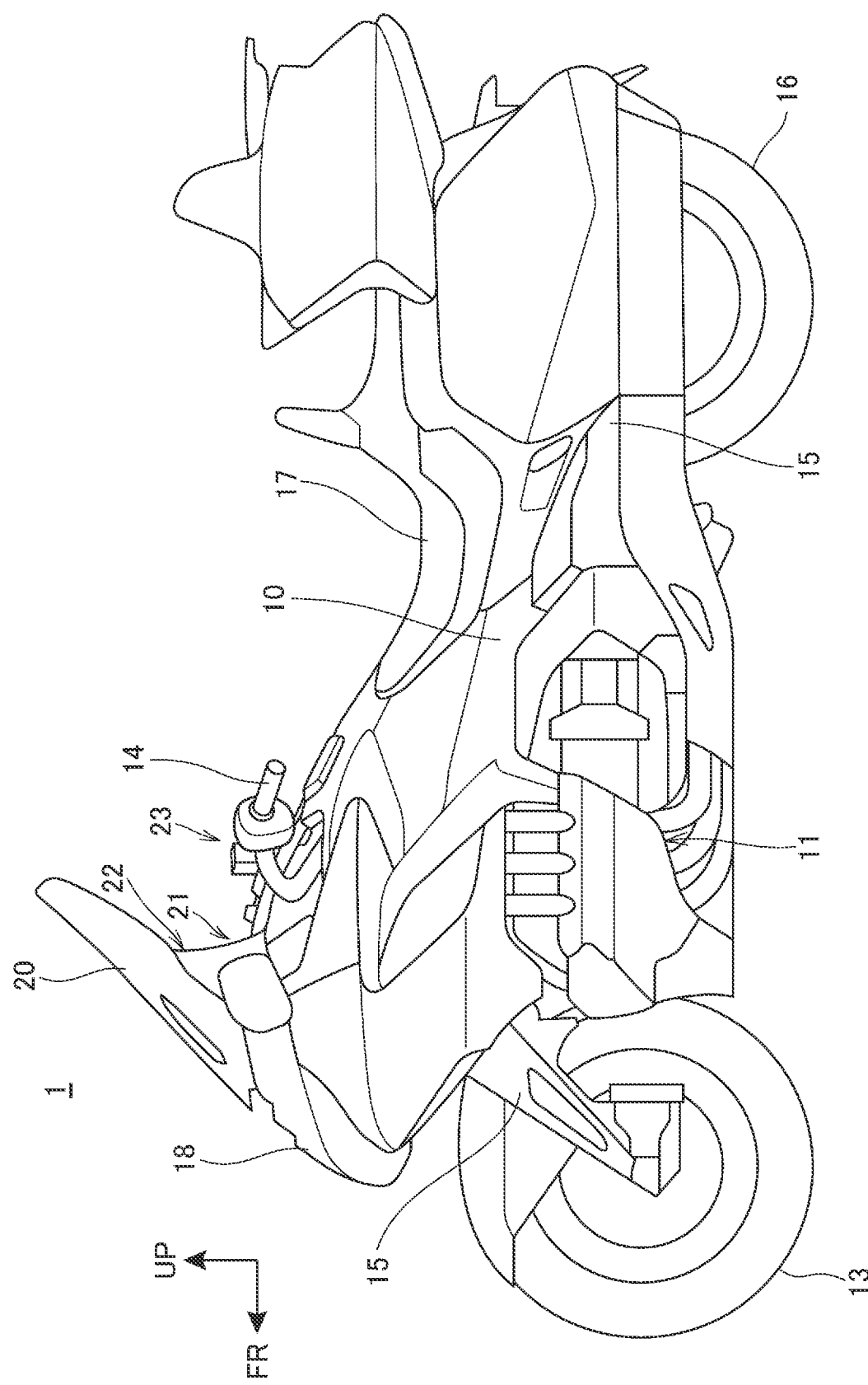
FIG. 1 is a side view of a motorcycle of an embodiment of a vehicle of the present invention.
Figure 2:
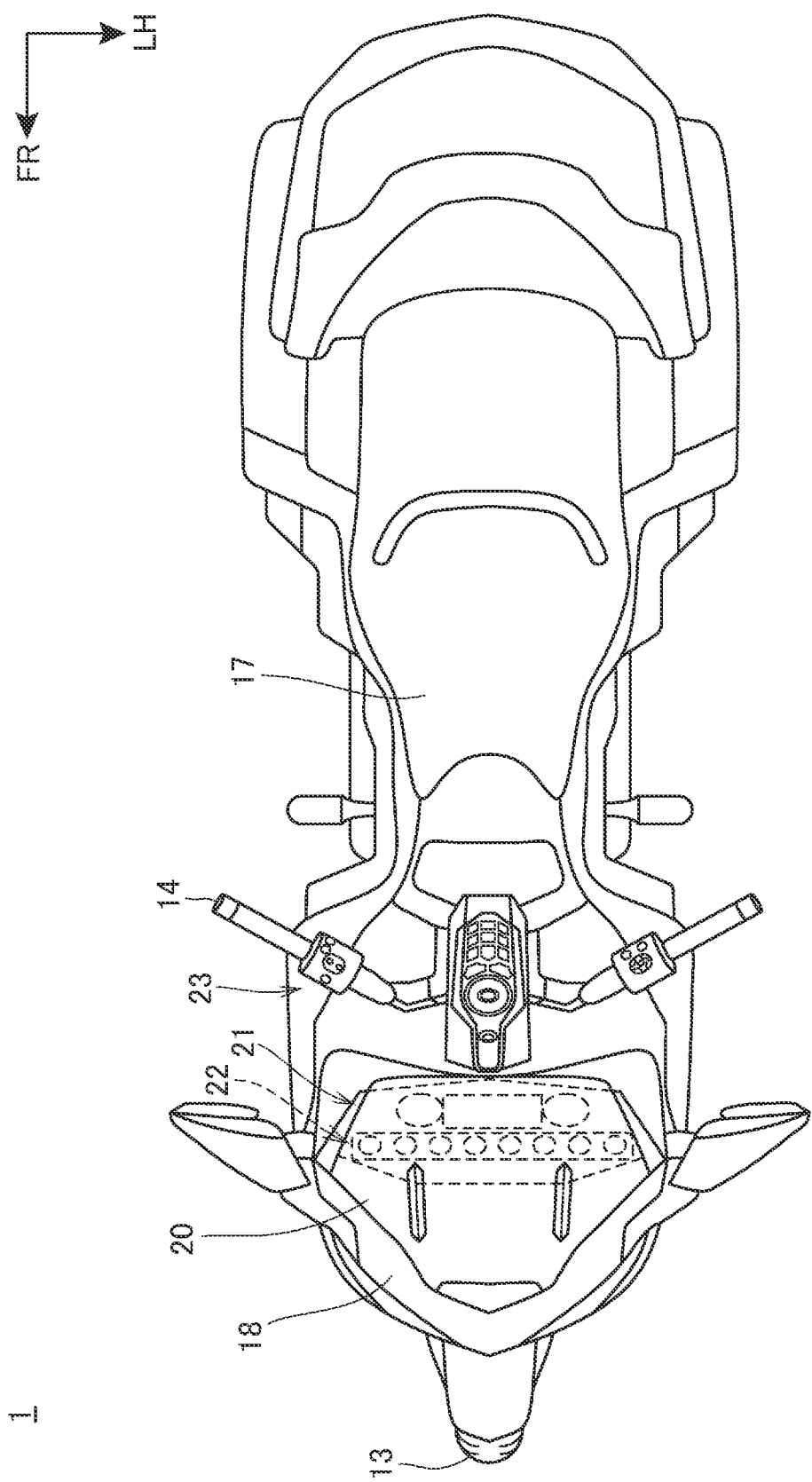
FIG. 2 is a top view of the motorcycle.

FIG. 1 is a side view of a motorcycle of an embodiment of a vehicle of the present invention. FIG. 2 is a top view of the motorcycle. As in FIG. 1, the vehicle 1 including the motorcycle includes a vehicle body frame 10 and a power unit 11 supported by the vehicle body frame 10. A front wheel 13 is supported by the front portion of the vehicle body frame 10 to be steerable left and right via a front fork 12 that serves also as a front cushion. A steering handlebar 14 is provided to the upper portion of the front fork 12. A rear wheel 16 is supported by the rear lower portion of the vehicle body frame 10 via a swing arm 15 to be pivotable up and down. A rear cushion is inserted between the vehicle body frame 10 and the swing arm 15. The power unit 11 includes an engine and a transmission to rotate the rear wheel 16 via a shaft drive mechanism.

As in FIG. 2, the vehicle body frame 10 supports a seat 17 on which occupants including a rider and a pillion passenger are seated rearward of the steering handlebar 14. The vehicle body frame 10 supports a vehicle body cover 18 that covers the substantially entire vehicle body frame 10. A front screen 20 that covers the front of the occupant is mounted to the vehicle body cover 18. Between the front screen 20 and the steering handlebars 14, a meter panel 21 that displays various pieces of information and a speaker array 22 that functions as a speaker unit are disposed. An operation portion 23 (a touch panel, switches) that executes menu selection or the like in the meter panel 21 is disposed around the steering handlebar 14.

An in-vehicle device 51 (FIG. 3 mentioned later) electrically connected to the meter panel 21, speaker array 22, and operation portion 23 are mounted to the vehicle 1. The in-vehicle device 51 controls display content of the meter panel 21 and output sounds of the speaker array 22. The in-vehicle device 51 inputs various instructions from a driver (hereafter written as a "rider" appropriately) via the operation portion 23.

Figure 3:
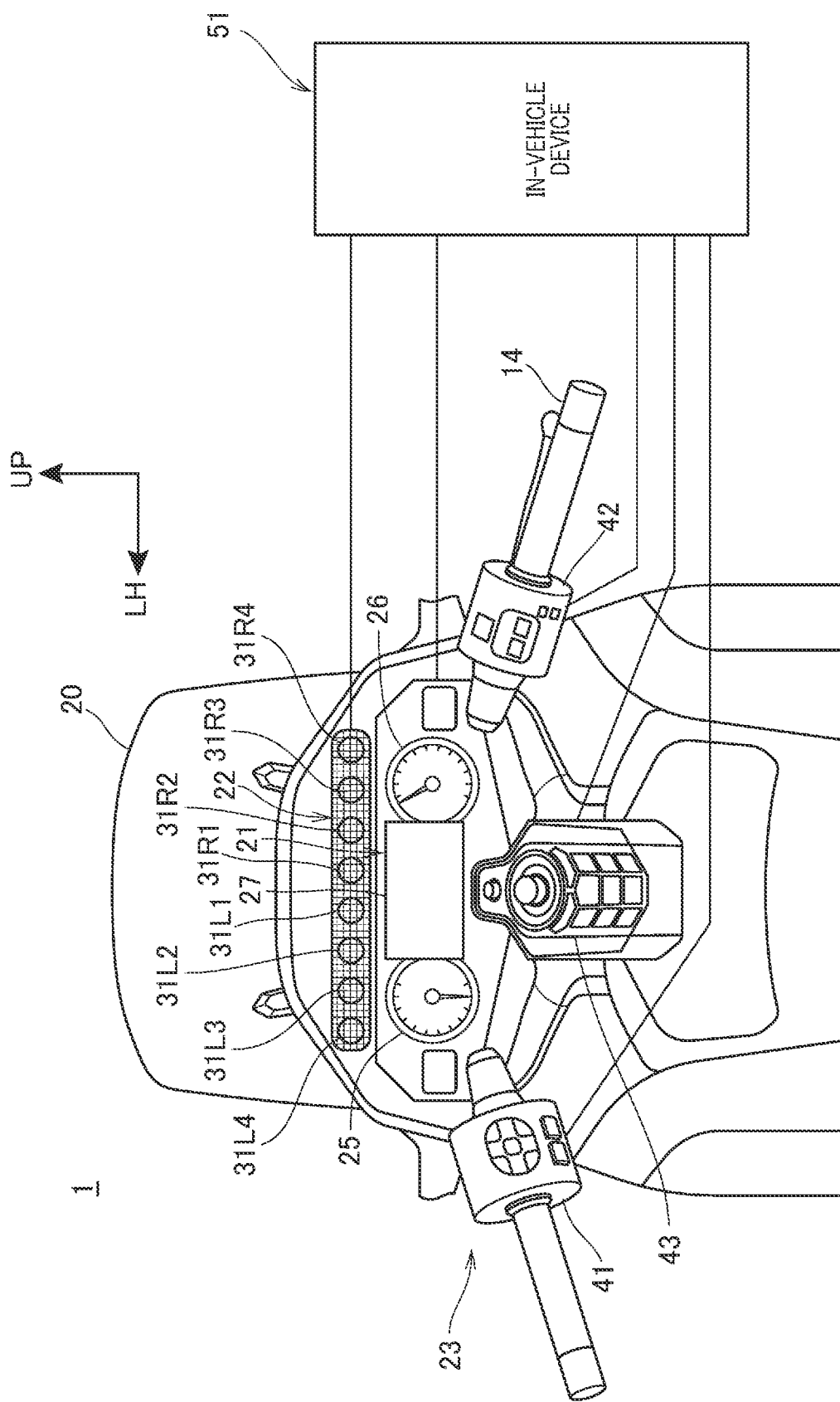
FIG. 3 illustrates a circumference of a meter panel seen from a rider together with an in-vehicle device.

FIG. 3 illustrates the circumference of the meter panel 21 seen from the rider together with the in-vehicle device 51. The meter panel 21 includes meters 25 and 26 that display information about the vehicle 1 (speed or engine speed) and a display portion 27 that displays various pieces of information. The display portion 27 includes a well-known display panel such as a liquid crystal panel. Under control of the in-vehicle device 51, the display portion 27 displays various pieces of information to the rider etc. A touch panel that forms part of the operation portion 23 is disposed over the display panel of the display portion 27.

The speaker array 22 includes a plurality of speakers (reference signs 31L1 to 31L4 and 31R1 to 31R4 in FIG. 3) are aligned in the width direction of the vehicle 1. The speaker array 22 is a speaker unit that extends an area where the rider etc. can hear in the width direction. The speaker array 22 is also called a line array speaker. The speaker array 22 is disposed above the meter panel 21. According to this placement, the speaker array 22 can be disposed nearer to the ears of the rider. Moreover, the sound from the speaker array 22 is easily prevented from decreasing due the influence of the steering handlebar 14.

In the present configuration, with respect to a central position in the vehicle width direction (corresponding to a central position in front of the rider), four speakers 31L1 to 31L4 are disposed on the left side, and four speakers 31R1 to 31R4 are disposed on the right side. In this configuration, even when the head of, e.g., the rider moves right or left etc., the sound from any of the left speakers 31L1 to 31L4 and the sound from any of the right speakers 31R1 to 31R4 are easily audible to the rider etc.

The left speakers 31L1 to 31L4 include a "first left speaker 31L1," a "second left speaker 31L2," the "third left speaker 31L3," and a "fourth left speaker 31L4" from the inside to outside of the vehicle 1 in the vehicle width direction. The right speakers 31R1 to 31R4 include a "first right speaker 31R1", a "second right speaker 31R2", a "third right speaker 31R3", and a "fourth right speaker 31R4" from the inside to outside of the vehicle 1 in the vehicle width direction. When do not need to be separately described in particular, these speakers 31L1 to 31L4 and 31R1 to 31R4 are described as the "speakers 31."

The operation portion 23 of the vehicle 1 includes a left operation portion 41 and a right operation portion 42 respectively provided to the left and right of the steering handlebar 14 and an operation portion 43 disposed between the speaker array 22 and the seat 17 and in the center in the vehicle width direction. The operation portions 41 to 43 include a switch group forming an operation system relating to the display portion 27 of the meter panel 21 and the speaker array 22, in addition to a switch group forming a general operation system such as manipulations of light devices such as a blinker of the vehicle 1 and ON/OFF of the power unit 11.

The in-vehicle device 51 detects manipulations of the switch group forming the operation system relating to the display portion 27 and the speaker array 22 in the operation portions 41 to 43. The in-vehicle device 51 then executes various processes based on the detected manipulations. When the in-vehicle device 51 has functions to execute control of the light devices of the vehicle 1 and control corresponding to ON/OFF of the power unit 11, the in-vehicle device 51 may detect these manipulations and execute the control of the light devices and the control corresponding to ON/OFF of the power unit 11 based on the detected manipulations.

Figure 4:
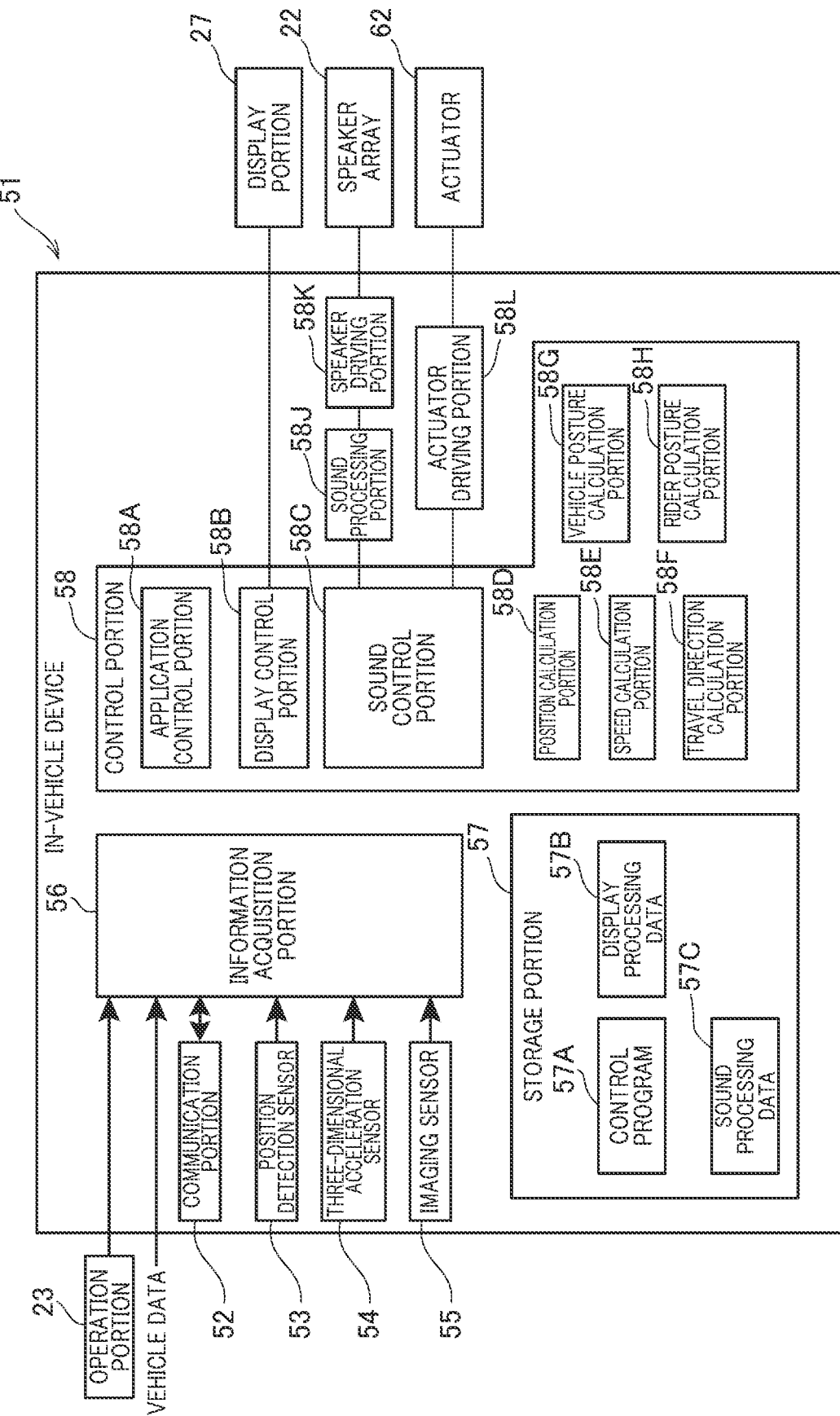
FIG. 4 is a block diagram illustrating a configuration of the in-vehicle device.

FIG. 4 is a block diagram illustrating a configuration of the in-vehicle device 51.

The in-vehicle device 51 includes a communication portion 52, a position detecting sensor 53, a three-dimensional acceleration sensor 54, an imaging portion 55 (camera), an information acquisition portion 56, a storage portion 57, and a control portion 58. The communication portion 52 has an antenna and a communication module (transceiver/receiver) capable of communicating with a portable communication terminal carried by the rider etc. (for example, a smart phone or an intercom for motorcycles etc. worn by the rider etc.). The position detecting sensor 53 is a sensor capable of detecting a current position, for example, a GPS unit. The three-dimensional acceleration sensor 54 detects a three-dimensional acceleration to acquire data indicating a postural change of the vehicle 1 including a tilt (for example, an angle of a bank) in the vehicle width direction. The imaging portion 55 captures an area including the head of the rider to acquire image data that identifies a position of the head.

The information acquisition portion 56 is an input interface to input various pieces of information. The information acquisition portion 56 converts the inputted information to digital data capable of being processable by the control portion 58 and outputs the data to the control portion 58. This information acquisition portion 56 acquires communication data of the communication portion 52, detection results of the position detecting sensor 53, detection results of the three-dimensional acceleration sensor 54, imaging results of the imaging portion 55, etc., and outputs the data and results to the control portion 58. Furthermore, the information acquisition portion 56 acquires manipulation results of the operation portion 23 provided to the vehicle 1 and vehicle data detected by the various sensors provided to the vehicle 1. Then, the information acquisition portion 56 outputs the acquired results and data to the control portion 58. The vehicle data includes information that identifies the speed and acceleration of the vehicle 1. For example, the information includes signals indicating engine speeds, gear ratios, or vehicle speeds. In addition, the communication portion 52, the position detecting sensor 53, the three-dimensional acceleration sensor 54, and the imaging portion 55 are not limited to the configuration built in the in-vehicle device 51, and may be disposed outside the in-vehicle device 51. When the vehicle 1 has a configuration equivalent to any of the communication portion 52, the position detecting sensor 53, the three-dimensional acceleration sensor 54, and the imaging portion 55, the vehicle 1 may acquire the above information from this configuration. Any of the communication portion 52, the position detecting sensor 53, the three-dimensional acceleration sensor 54, and the imaging portion 55 may be omitted from the in-vehicle device 51.

The storage portion 57 stores various data used by the control portion 58. More specifically, the storage portion 57 stores a control program 57A, display processing data 57B, sound processing data 57C, etc. The control program 57A includes programs to execute each process such as a process of outputting display information to the display portion 27, a process of outputting sounds to the speaker array 22, a navigation process, a music reproduction process, a phone call process, etc. The display processing data 57B is required for the display process and includes images of, e.g., menus displayed as options selected by the rider and data indicating, e.g., a hierarchy of each menu.

The sound processing data 57C is required for sound processing. The data includes data that allows determination of a head-related transfer function indicating an impulse response from a position of a virtual sound source to the eardrum of a listener (rider etc.). The head-related transfer function is information used for a well-known three-dimensional sound reproduction technology. A well-known filtering for convoluting the head-related transfer function is executed to sound data to be outputted. The filtering allows reproduction of a sound field that reaches the rider etc. from a position of a virtual sound source. For example, the present configuration selectively uses multiple head-related transfer functions previously prepared. In front of the vehicle 1, a sound field in which a sound reaches the rider etc. from a different virtual sound source is reproduceable at least in any one of the left, right, front, and rear.

The control portion 58 controls each portion of the in-vehicle device 51 to function as a computer that executes control about the display portion 27 and speaker array 22 of the vehicle 1. More specifically, the control portion 58 executes the control program 57A stored in the storage portion 57 to function as an application control portion 58A that executes control about applications, a display control portion 58B that executes control about display, and a sound control portion 58C that executes control about sounds. The control contents of the control portions 58A to 58C are mentioned later.

Further, the control portion 58 executes the control program 57A to function also as a position calculation portion 58D, a speed calculation portion 58E, a travel direction calculation portion 58F, a vehicle posture calculation portion 58G, and a rider posture acquisition portion 58H. The position calculation portion 58D calculates a current position of the vehicle 1 on a map based on a detection result of the position detecting sensor 53. The speed calculation portion 58E calculates values of, e.g., a vehicle speed and an acceleration based on vehicle data (for example, signals indicating an engine speed, a gear ratio, or a vehicle speed). The travel direction calculation portion 58F calculates a traveling direction of the vehicle 1 based on data acquired from at least any of detection results of the position detecting sensor 53 and the three-dimensional acceleration sensors 54.

The vehicle posture calculation portion 58G calculates data indicating a postural change of the vehicle 1 based on a detection result of the position detecting sensor 53. In this configuration, a tilt angle in the vehicle width direction is calculated as data indicating a postural change of the vehicle 1. The tilt angle includes a bank angle indicating a tilt inward of a curve during travel. The tilt angle is also called a rolling angle that is a rotation angle about a longitudinal axis of the vehicle 1. The rider posture acquisition portion 58H acquires information that identifies a position of the head of the rider based on image data of the imaging portion 55. More specifically, the rider posture acquisition portion 58H determines a position of a helmet of the rider from the image data by applying an image recognition technology. The rider posture acquisition portion 58H acquires information that identifies a height of the head of the rider from the determined position of the helmet. The process to acquire the information that identifies the height of the head of the rider may use, e.g., an estimation process to substantially estimate a height of a predetermined portion in the image by applying the image recognition technology.

Based on an instruction inputted via the operation portion 23, the application control portion 58A executes a navigation process, a music reproduction process, a process that realizes a telephone, etc. The navigation process uses information calculated by the position calculation portion 58D etc. to display map data including a current position and to guide a routing assistance from the current position to a predetermined destination by a display and a sound. The music reproduction process receives sound data such as music tunes from a smartphone communicatively connected via the communication portion 52 to output a sound corresponding to the sound data. The process to realize a telephone call is a well known process that uses a smartphone communicatively connected via the communication portion 52 to realize a hands-free call. The hands-free call may use an intercom worn by the rider or a microphone previously installed to the vehicle 1 to collect voice of the rider. The processes executable by the application control portion 58A are not limited to the above ones. Well-known processes may be applied appropriately.

The display control portion 58B acquires display data of a display target by the application control portion 58A. The display control portion 58B outputs the display data to the display portion 27. The display control portion 58B displays a menu screen where processes corresponding to a navigation, music reproduction, and telephone call are selectable and various images about each of the navigation, music reproduction, and telephone call onto the display portion 27. The sound control portion 58C acquires the sound data to be emitted by the application control portion 58A, and outputs the sound corresponding to the sound data from the speaker array 22.

The in-vehicle device 51 has a sound processing portion 58J (refer to FIG. 4) which can execute filter processing to sound data. The filtering executes convolutions of the head-related transfer functions stored in the sound processing data 57C. The sound processing portion 58J has DSP (Digital Signal Processing) and can execute various sound processes for sounds such as the above filter processing and volume control. Sound data outputted from the sound processing portion 58J is digital-to-analog converted, and outputted to a speaker driving portion 58K. The sound corresponding to the sound data is outputted from the speaker array 22 by the speaker driving portion 58K. Thus, the sound data targeted for sound emission by the application control portion 58A is converted to sound data that arrives from a virtual sound source that is set in a predetermined position. The corresponding sound is outputted from the speaker array 22.

Figure 5:
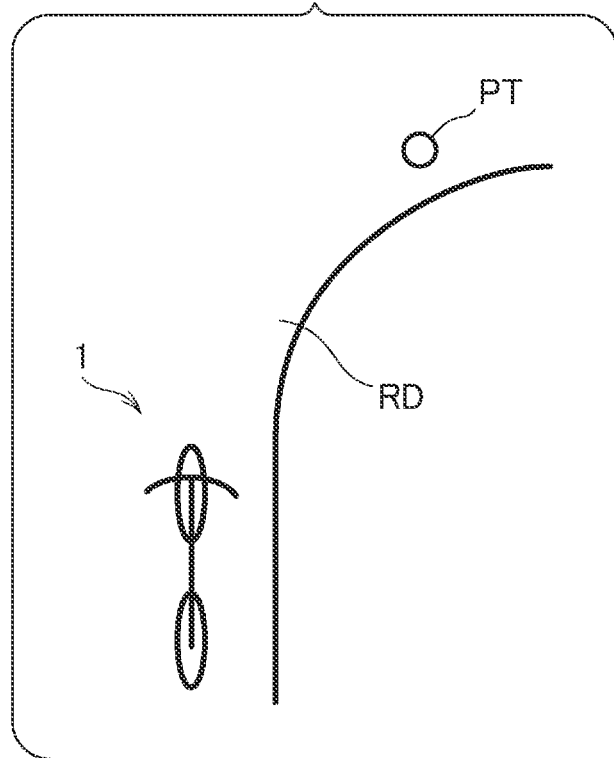
FIG. 5 schematically illustrates an example of control of a sound control portion 58C.

FIG. 5 schematically illustrates an example of control of the sound control portion 58C.

In FIG. 5, a reference sign PT is a position of a virtual sound source and hereinafter described as a sound source position PT appropriately. In FIG. 5, a reference sign RD illustrates a road surface on which the vehicle 1 travels. FIG. 5 illustrates the vehicle 1 traveling on a right curve.

The sound control portion 58C sets the sound source position PT to a traveling destination of the vehicle 1. For example, the sound control portion 58C estimates a traveling position of the vehicle 1 after preset t seconds from the present time to set the sound source position PT to the estimated traveling position. For example, in the estimation of the traveling position, the sound control portion 58C acquires data on the road surface at the traveling destination by using a current position and map data. Then, based on a curvature of the road surface, the current vehicle speed, the acceleration, etc., the sound control portion 58C may calculate the traveling position after t seconds. The speed after t seconds may be set to, for example, the same speed as a current speed or to a speed estimated from the current speed based on the acceleration. The estimation of a traveling position is not limited to the above method and may use information about a travel route to a destination identified by a navigation process. A well-known estimation process is widely applicable.

The sound source position PT may always be set to a traveling destination after t seconds from a current position. The sound source position PT may be updated at a predetermined time interval or at a predetermined distance interval. The setting method of the sound source position PT may be changed appropriately. In the vehicle 1, a guidance sound in the navigation process, a sound of a musical tune in the music reproduction process, a sound of a telephone partner, etc. are outputted from the speaker array 22 as sounds that arrive from the sound source position PT. Therefore, the rider can recognize the sounds arriving from the sound source position PT at a traveling destination while viewing the traveling destination. Advantageous effects such as improvement in easiness of listening or a driving assist to guide a gaze of the rider on traveling to a direction to be gazed is easily acquirable.

Figure 6:
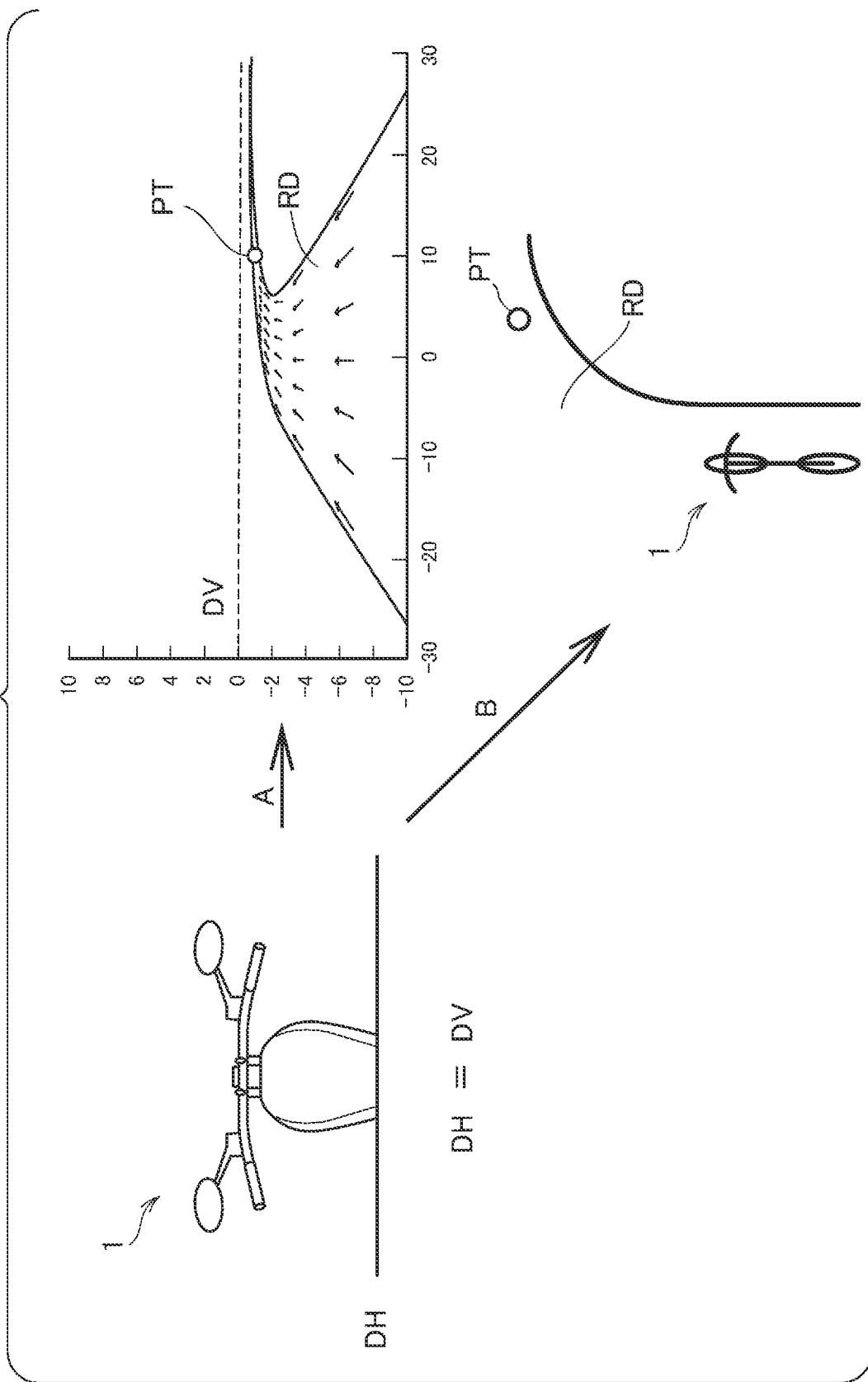
FIG. 6 explains a sound source position when the vehicle is upright.

When the sound source position PT is set as mentioned above, the following situation arises. As shown in FIG. 6, when the vehicle 1 is upright, the head-related transfer function where a traveling destination after t seconds is set as the sound source position PT is used for the vehicle 1. The rider is thus capable of recognizing the traveling destination after t seconds as the sound source position PT. A reference sign A of FIG. 6 illustrates the sound source position PT seen from the rider. A reference sign B illustrates the sound source position PT seen from an upper portion. In FIG. 6, a vehicle width direction DV and a horizontal direction DH are aligned.

Figure 7:
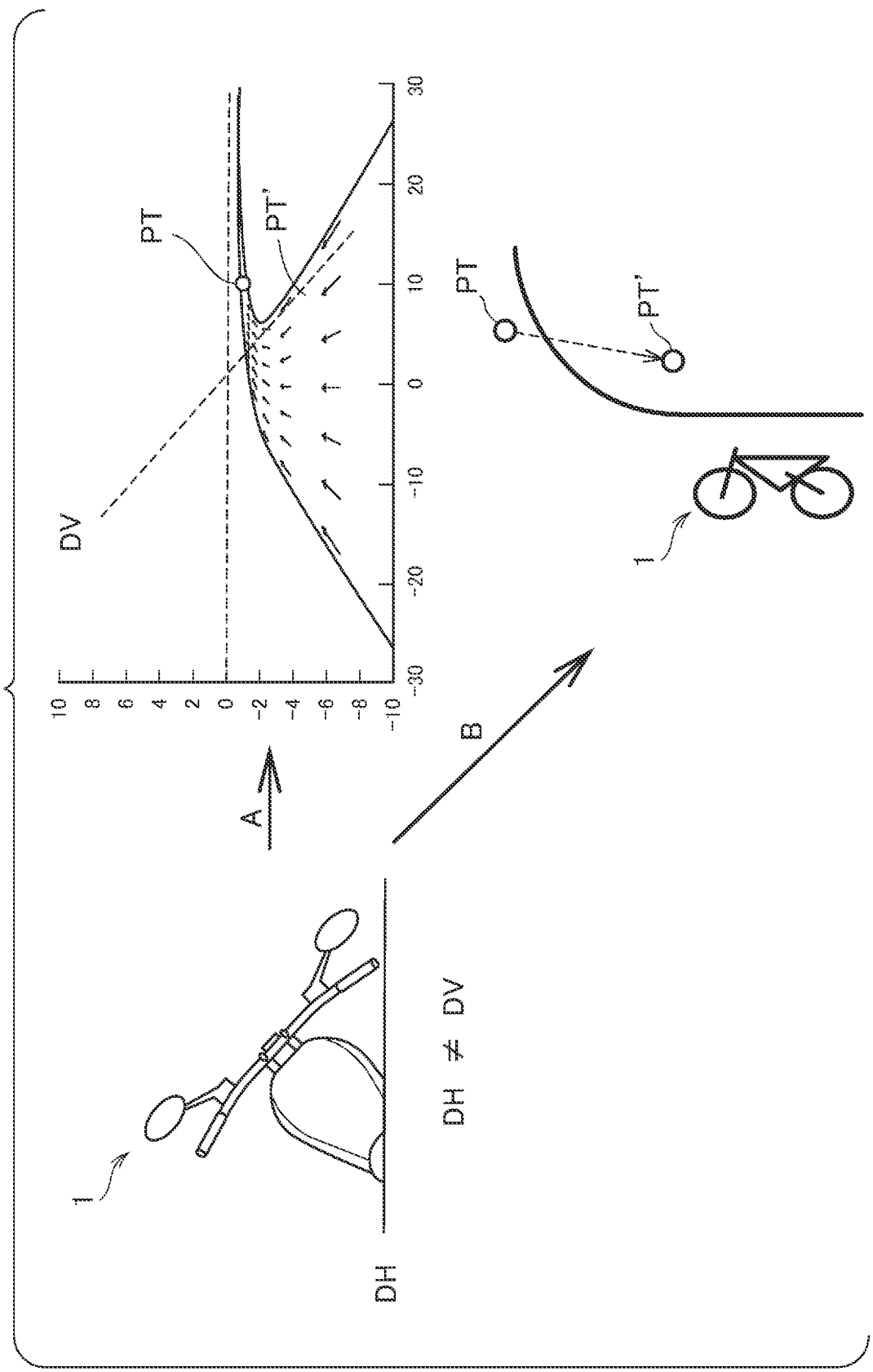
FIG. 7 explains a sound source position when the vehicle tilts in the vehicle width direction.

In contrast, as in FIG. 7, when the same head-related transfer function as in FIG. 6 is used in the case where the vehicle 1 tilts in the vehicle width direction DV (corresponding to the case where the vehicle width direction DV and horizontal direction DH intersect), a sound source position PT' recognized using the sound that arrives at the ears of the rider from the speaker array 22 is recognized as a position that is offset from the sound source position PT in the upright state by the tilt angle of the vehicle 1. This is because the speaker array 22 tilts in the same direction as the vehicle 1. A reference sign A of FIG. 7 illustrates the sound source positions PT' and PT seen from the rider. A reference sign B illustrates the sound source positions PT' and PT seen from above.

Figure 8A:
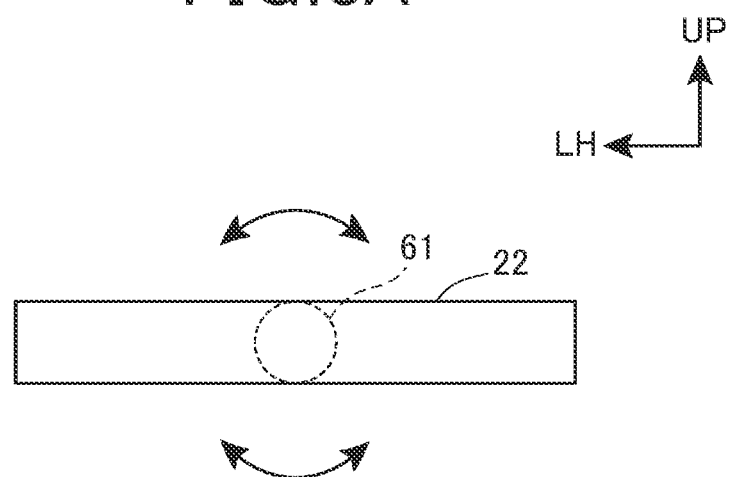
FIG. 8A and FIG. 8B explain a speaker array.
Figure 8B:
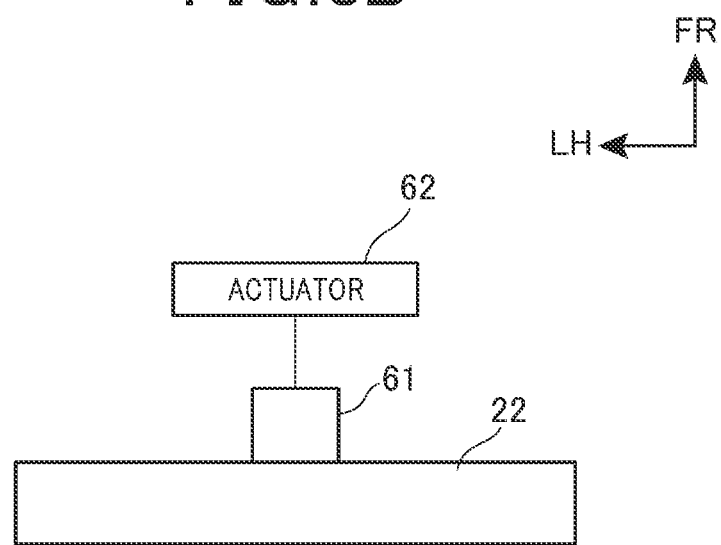

Therefore, in the present configuration, as in FIG. 8A and FIG. 8B, the speaker array 22 tilts leftward or rightward of the vehicle 1 and a correction process (Step S2 in FIG. 9 mentioned later) of the target sound source position PT is executed based on the vehicle posture.

FIG. 8A and FIG. 8B are figures schematically illustrating the speaker array 22 from different directions. The speaker array 22 is rotatably supported about a rotation axis 61 extending in the longitudinal direction in the vehicle width center of the vehicle 1 (in the lateral center of the rider). The rotation axis 61 can be rotated by an actuator 62. The actuator 62 is driven by an actuator drive portion 58L (refer to FIG. 4) of the in-vehicle device 51. The actuator drive portion 58L is a circuit to control power driving the actuator 62.

The rotation axis 61 and the actuator 62 may be integrated with each other. Moreover, the configuration in which the speaker array 22 is tiltable in the lateral direction of the vehicle 1 is not limited to the above configuration but may use other configurations. Each speaker 31L1 to 31L4 and 31R1 to 31R4 of the speaker array 22 may be separately configured to be tiltable, for example, in the lateral direction.

FIG. 9 is a flowchart indicating operations about a virtual sound source by the sound control portion 58C. This operation flow is repeated during travel of the vehicle 1 (for example, while the ignition is ON) or while the power source of the in-vehicle device 51 is ON.

First, the sound control portion 58C sets the sound source position PT as a target (hereafter described as a "target sound source position PT" appropriately) (Step S1). Step S1 is equivalent to the process that sets the target sound source position PT with respect to the upright state of the vehicle 1. FIG. 10 illustrates a flowchart of an example of processing of Step S1. As in FIG. 10, the sound control portion 58C acquires a current position, vehicle speed, acceleration of the vehicle 1 and map data (Step S1A), estimates a traveling position after t seconds based on the acquired information (Step S2A), and sets the target sound source position PT based on the estimated position (Step S3A).

Figure 11:
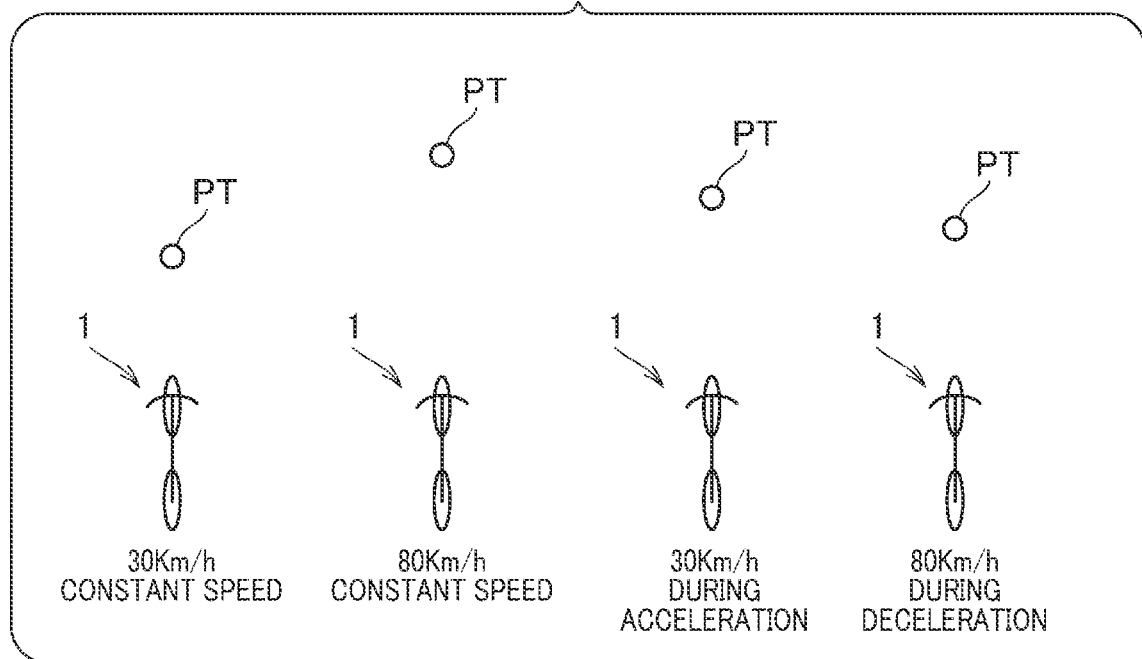
FIG. 11 explains Step S3A of FIG. 10.

As in FIG. 11, in Step S3A, the target sound source position PT is set based on whether the vehicle 1 is traveling at a constant speed, on whether the vehicle 1 is accelerating or decelerating, and on information about the vehicle speed. The rider tends to gaze at a farther position as the vehicle speed or acceleration is greater. The rider tends to gaze at a nearer position as the vehicle speed or acceleration is less. As in FIG. 11, in response to the tendency, the target sound source position PT is set to a position easily seen from the rider or a position to which the gaze of the rider is appropriately guided.

Returning to FIG. 9, after Step S1, the sound control portion 58C executes a correction process (hereafter described as a "first correction process" appropriately) for the target sound source position PT based on a vehicle posture (Step S2).

Figure 12:
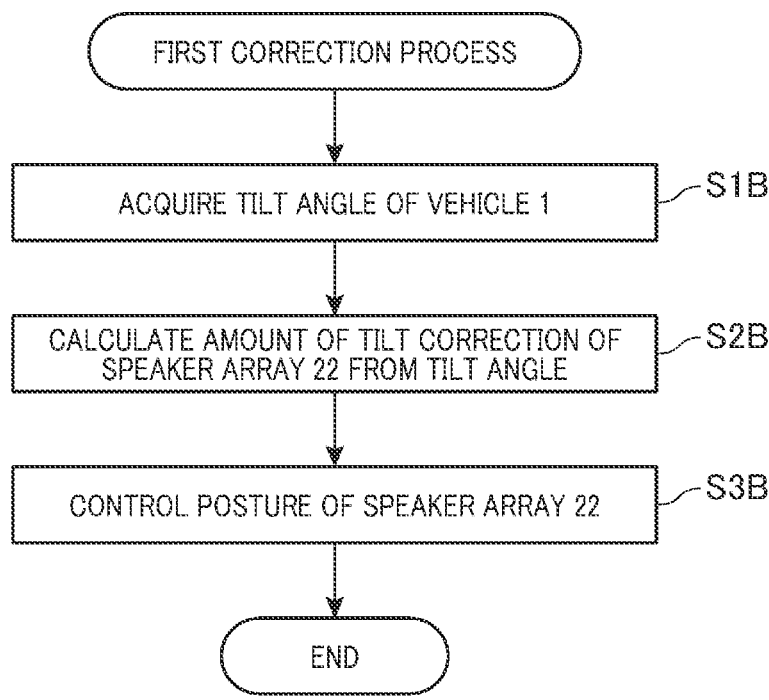
FIG. 12 is a flowchart of a first correction process.

FIG. 12 illustrates a flowchart of the first correction process. The sound control portion 58C acquires a tilt angle of the vehicle 1 calculated by the vehicle posture calculation portion 58G (Step S1B). Based on the acquired tilt angle, the sound control portion 58C calculates an amount of angle correction of the speaker array 22 (Step S2B). The amount of angle correction is an angle required to make the speaker array 22 be horizontal. When the tilt angle of the vehicle 1 is 30 degrees, the amount of angle correction of the speaker array 22 is minus 30 degrees. Subsequently, the sound control portion 58C drives the actuator 62 by the actuator drive portion 58L to control the speaker array 22 at the horizontal angle. The speaker array 22 is controlled at the horizontal angle. Thus, regardless of whether the vehicle 1 tilts in the width direction, it is easy to hold a position of the virtual sound source recognized by the rider in the same position.

Figure 13:
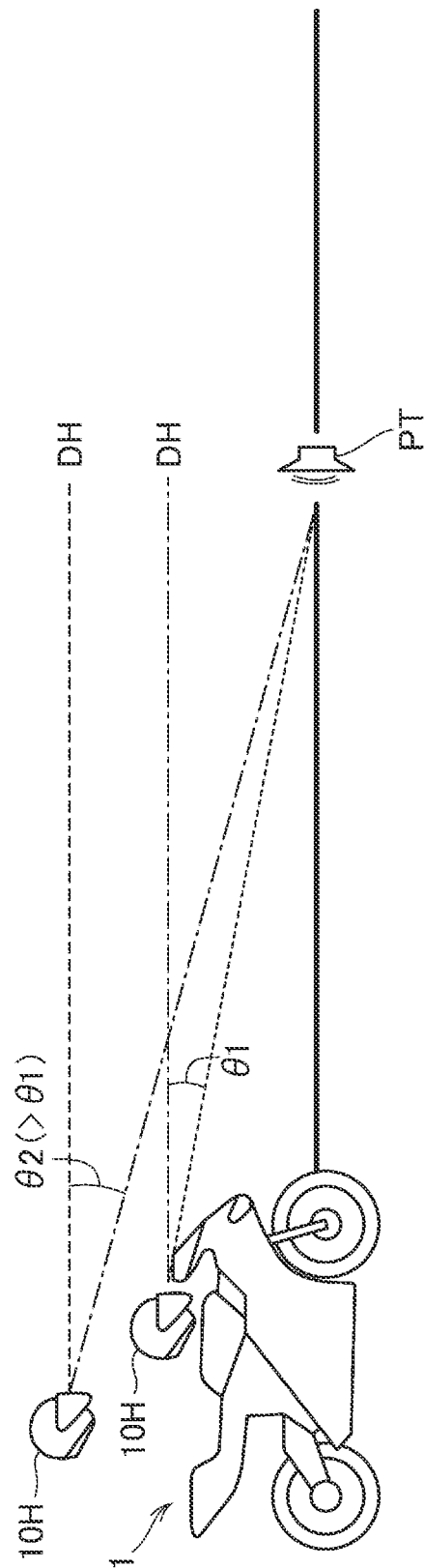
FIG. 13 illustrates a change of a gaze angle to a sound source position with a posture change of a rider.

A rider of a motorcycle may drive in the upright state or the bending state. The postural change is larger than that of a driver of a four-wheeled vehicle. As illustrated in FIG. 13, in response to the postural change, eye gaze angles θ1 and θ2 to the target sound source position PT change. This causes discomfort etc. of the rider.

A reference sign 10H illustrates a helmet that covers the head of the rider in FIG. 13. The angle θ1 illustrates an eye gaze angle when the rider bends. The angle θ2 illustrates an eye gaze angle when the rider is upright.

In the present configuration, as shown in FIG. 9, the correction process of the target sound source position PT is executed based on the posture of the rider (hereafter described as the "third correction process" appropriately) (Step S3). In the third correction process, in response to the positional change of the helmet 10H of the rider, a sound volume correction process is also executed to correct the sound volume of the sound corresponding to the virtual sound source.

Figure 14:
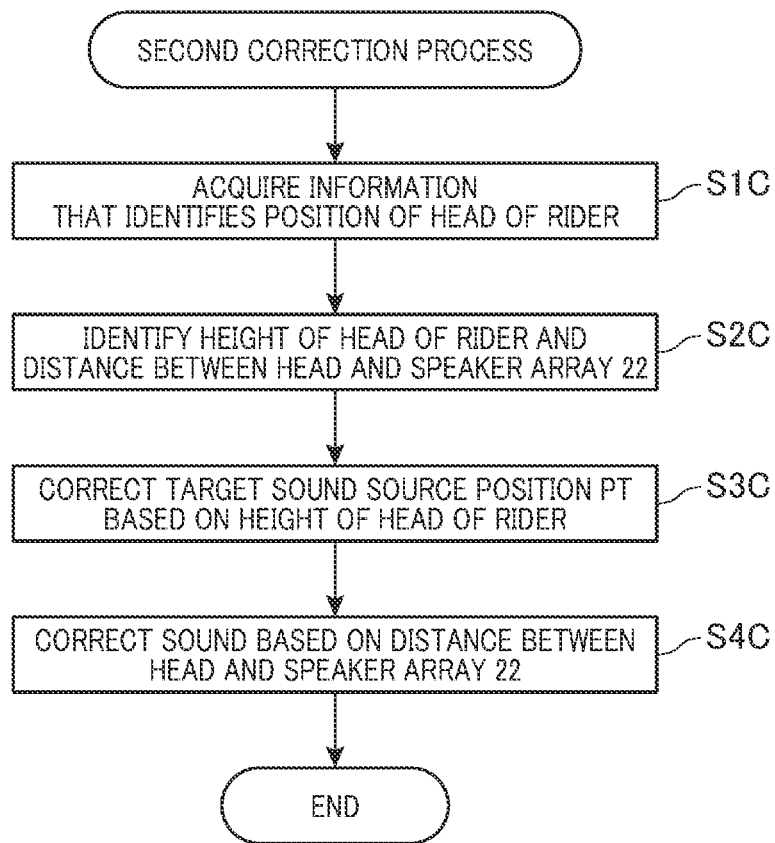
FIG. 14 is a flowchart of a third correction process.

FIG. 14 illustrates a flowchart of the third correction process.

Figure 15:
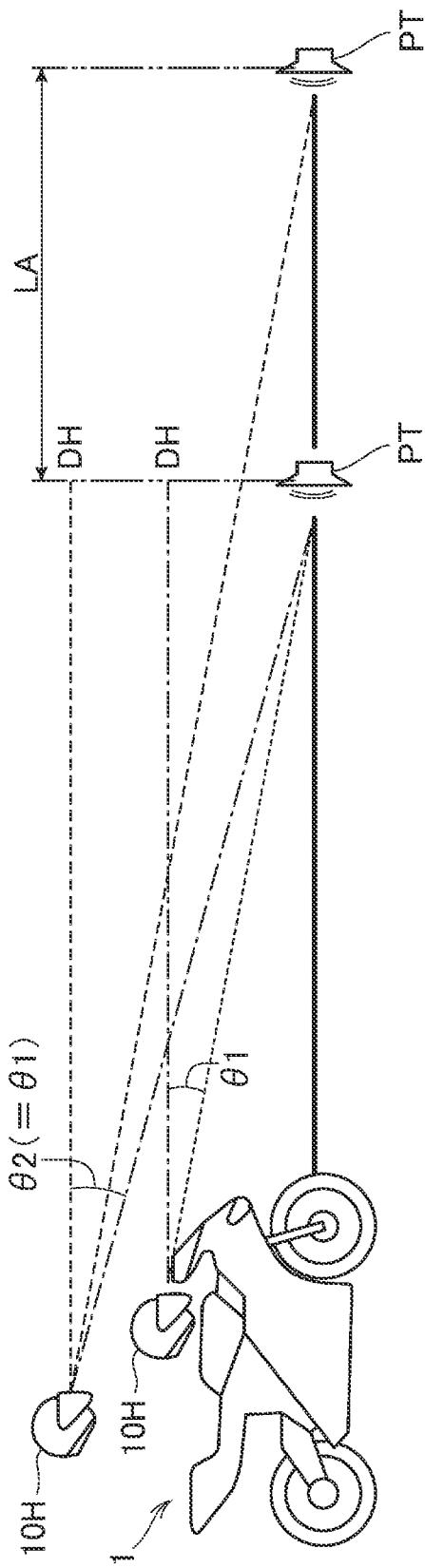
FIG. 15 explains control of a gaze angle to a sound source position with a posture change of a rider.

The sound control portion 58C acquires the information that detects the posture of the rider acquired by the rider posture acquisition portion 58H. That is, the sound control portion 58C acquires the information indicating the position of the head (Step S1C). Next, the sound control portion 58C determines a height of the head from the acquired information and determines a distance between the head and the speaker array 22 (Step S2C). Subsequently, based on the height of the head of the rider, the sound control portion 58C corrects the target sound source position PT in the longitudinal direction of the vehicle 1. Then, the target sound source position PT is corrected to reduce the change in the gaze relative to the virtual sound source with the change in the height of the head of the rider. As in FIG. 15, the target sound source position PT is capable of being set to match the gaze angle θ1 when the rider bends and the gaze angle θ2 when the rider is upright. A reference sign LA in FIG. 15 illustrates an amount of longitudinal correction for the target sound source position PT.

Since the target sound source position PT is corrected in the longitudinal direction of the vehicle 1 based on the height of the head of the rider, the gaze angles θ1 and θ2 are easily matched as the same value without detecting the position of the eyes directly.

Then, as the sound volume correction process, the sound control portion 58C corrects the sound volume of the speaker array 22 based on the distance between the head and the speaker array 22. The sound volume is then corrected to reduce the change in sound volume with the postural change of the rider. It is easy to reduce discomfort of the sound with the postural change of the rider also by this sound volume correction.

As in FIG. 9, after executing the first to third correction processes, the sound control portion 58C outputs sound based on the corrected target sound source position PT and the corrected sound volume (Step S4). Thus, the sound to be emitted is recognized by the rider as a sound that arrives from the corrected target sound source position PT, and heard by the rider with the corrected sound volume.

The present embodiment has explained the case where the speaker array 22 is provided laterally of the vehicle 1 in the tiltable manner. This configuration may not be limiting. The speaker array 22 may be provided to the vehicle 1 to be changeable in posture in various directions. However, the speaker array 22 is preferably provided in the posture changeable manner to suppress the positional change of the virtual sound source due to the postural change during travel of the vehicle 1. The present embodiment describes the case where the sound control portion 58C automatically adjusts the position of the virtual sound source in response to the postural changes of both the vehicle 1 and rider. This automatic adjustment may not be used. For example, in case of a vehicle such as the vehicle 1 traveling at a low speed, the speaker array 22 may be manually changed in posture.

As explained above, the sound control portion 58C is capable of changing the sound outputted from the plural speakers 31 to the sound that arrives from the virtual sound source that is set to a predetermined position. This optimizes the position PT of the virtual sound source in response to the postural change of the vehicle 1. Each speaker 31 is configured changeably in posture relative to the vehicle 1 to adjust the position PT of the virtual sound source relative to the vehicle 1. According to this configuration, positional adjustment of the virtual sound source is easily executable. The degree of freedom in adjustment of the position PT of the virtual sound source is thus improvable.

The sound control portion 58C sets the position PT of the virtual sound source based on the upright state of the vehicle 1. Each speaker 31 is provided changeably in posture relative to the vehicle 1. This enables adjustment in positional change of the virtual sound source due to the postural change from the upright state of the vehicle 1. A positional offset of the virtual sound source due to the postural change from the upright state of the vehicle 1 is easily preventable by the postural change of each speaker 31. This is effective especially for a motorcycle. The motorcycle has a vehicle body tilting greater in cornering because the motorcycle corners using the lateral force (camber thrust) generated by the camber angles of the front and rear wheels.

The plural speakers 31 are aligned in the width direction of the vehicle 1 and provided laterally of the vehicle 1 in the tiltable manner. Thus, each speaker 31 is easily adjustable not to offset the position of the virtual sound source relative to the road surface RD when the vehicle 1 tilts in the width direction. The speaker array 22 in which the plural speakers 31 are disposed is provided. The speaker array 22 is rotatably supported about the rotation axis 61 provided to a predetermined position to be tiltable in the lateral direction of the vehicle 1. Each speaker 31 is thus adjustable using the simple configuration. The position of the rotation axis 61 may be appropriately changed.

In response to the postural change of the vehicle 1, the sound control portion 58C functions also as a speaker posture control portion to change the posture of each speaker 31. This can change the directional change of each speaker 31 relative to the road surface RD due to this postural change. Thus, the positional offset of the virtual sound source due to the postural change of the vehicle 1 is automatically suppressible. The sound control portion 58C changes the posture of each speaker 31 based on the tilt of the vehicle 1 in the width direction detected by the three-dimensional acceleration sensor 54. The positional change of the virtual sound source relative to the road surface RD due to the bank of the vehicle 1 is effectively suppressible.

The sound control portion 58C changes the position PT of the virtual sound source in the longitudinal direction of the vehicle 1 in response to at least one of the speed and acceleration. Thus, in response to the change in the gaze of the rider due to the speed or acceleration, the position PT of the virtual sound source is easily adjusted. In the present configuration, the case where the sound control portion 58C functions also as the speaker posture control portion has been explained. The speaker posture control portion may be provided independently.

In order to optimizes the position PT of the virtual sound source relative to the postural change of the rider, the present configuration includes the rider posture acquisition portion 58H that acquires the information that identifies the position of the head of the rider as an occupant posture acquisition portion that acquires the information that identifies the posture of the rider. The sound control portion 58C corrects the position of the virtual sound source based on the position of the head of the rider. Thus, even when the posture of the rider changes, the virtual sound source is easily set to reduce discomfort of the rider.

The present embodiment describes that the position of the virtual sound source is corrected based on the position of the head of the rider. This is not limited to the case where the rider posture acquisition portion 58H acquires the information that identifies the position of the head. The information that identifies the posture of the rider (the position of the eyes themselves, the position of the eye covering shield of the helmet 10H, or the position of the neck) may be acquired to identify the position of the eyes of the rider. In this case, the sound control portion 58C may identify the position about the eyes of the rider based on the acquired information and correct the position of the virtual sound source based on the identified position. For example, when the vehicle 1 is a bicycle, the rider of the bicycle may not wear the helmet 10H or the eyes of the rider are exposed even when the rider wears the helmet 10H. In such a case, the positions of the eyes, ears, or face may be acquired to correct the position of the virtual sound source based on the acquired positions.

The sound control portion 58C corrects the position of the virtual sound source based on the height of the head of the rider. Thus, the change in the gaze angle from the rider to the position of the virtual sound source due to the change in height of the head is easily suppressed. The change in the gaze angle is suppressed to make the rider easily pay attention to the virtual sound source while the rider sees the road surface at the traveling destination. The sound control portion 58C changes the position of the virtual sound source in the longitudinal direction of the vehicle 1 based on the height of the head the rider. Even when the height of the head changes, it is easy to control the change in the gaze angle.

The sound control portion 58C executes the sound volume correction process to correct the sound volume of the speaker array 22 based on the information acquired by the rider posture acquisition portion 58H. It is thus easy to reduce the sound volume change due to the postural change of the rider. It is easy also to reduce discomfort of the rider who hears the sound.

The above embodiment describes one embodiment of the present invention. The present invention is not limited to the above embodiment. For example, the case where the present invention is applied to the motorcycle has been explained. This is not limiting. The present invention may be applied to various vehicles in which a posture may change in traveling. Moreover, the case where the in-vehicle device 51 is previously mounted to the vehicle 1 has been illustrated. The in-vehicle device 51 may be configured to be later mounted to the various vehicles 1. Moreover, each configuration of the in-vehicle device 51 is optionally realizable by, e.g., cooperation of hardware and software and is appropriately changeable. The processes corresponding to the respective steps of each flowchart may be divided or merged. The control program 57A is downloaded from a distribution server etc. over a communication network via an electric communication line. The control program 57A is widely applicable to a program executable by a computer of any in-vehicle device or smartphone or to a program that is stored in a recording medium such as a magnetic recording medium, an optical recording medium, or a semiconductor recording medium and that is read from the recording medium and executed by the computer.

REFERENCE SINGS LIST

1 . . . Vehicle
10H . . . Helmet
21 . . . Meter panel
22 . . . Speaker Array (Speaker unit)
23, 41 to 43 . . . Operation portion
25, 26 . . . Meter
27 . . . Display portion
31, 31L1 to 31L4, 31R1 to 31R4 . . . Speaker
51 . . . In-vehicle device
52 . . . Communication portion
53 . . . Position detecting sensor
54 . . . Three-dimensional acceleration sensor
55 . . . Imaging portion
56 . . . Information acquisition portion
57 . . . Storage portion
58 . . . Control portion
58A . . . Application control portion
58B . . . Display control portion
58C . . . Sound control portion
58D . . . Position calculation portion
58E . . . Speed calculation portion
58F . . . Travel direction calculation portion
58G . . . Vehicle posture calculation portion
58H . . . Rider posture acquisition portion (occupant posture acquisition portion)
58J . . . Sound processing portion
58K . . . Speaker driving portion
58L . . . Actuator driving portion
61 . . . Rotation axis
62 . . . Actuator
DV . . . Vehicle width direction
DH . . . Horizontal direction
PT . . . Sound source position (target sound source position)
RD . . . Road surface

What is claimed is:

1. A vehicle including a plurality of speakers and a computer that controls a sound outputted from each of the plurality of speakers, wherein the computer
   acquires information that identifies a posture of an occupant of the vehicle, and
   controls a sound outputted from the plurality of speakers to a sound arriving from a virtual sound source that is set at a predetermined position, and corrects a position of the virtual sound source based on the posture of the occupant.

2. The vehicle according to claim 1, wherein
computer acquires information that identifies a position of a head of the occupant, and
corrects a position of the virtual sound source based on a position of the head of the occupant.

3. The vehicle according to claim 2, wherein
the computer corrects a position of the virtual sound source based on a height of the head of the occupant.

4. The vehicle according to claim 3, wherein
the computer changes a position of the virtual sound source to a longitudinal direction of the vehicle based on a height of the head of the occupant.

5. The vehicle according to claim 1, wherein
the computer further executes a sound volume correction process to correct a sound volume of the plurality of speakers based on the information.

* * * * *